United States Patent [19]

Hughes

[11] Patent Number: 5,072,797
[45] Date of Patent: Dec. 17, 1991

[54] CHECKWEIGHING METHOD AND APPARATUS

[76] Inventor: Melville G. Hughes, 22 High Street, Ashley, Newmarket, Suffolk, CB8 9DX, England

[21] Appl. No.: 541,059

[22] Filed: Jun. 20, 1990

[30] Foreign Application Priority Data

Jun. 24, 1989 [GB] United Kingdom ............ 8914557

[51] Int. Cl.⁵ .................. G01G 19/00; G01G 19/52; B65G 47/64
[52] U.S. Cl. .................................. 177/145; 177/50; 198/447
[58] Field of Search .................. 177/50, 145, 1; 209/592–596

[56] References Cited

U.S. PATENT DOCUMENTS 3,339,700 9/1967 Wells .................................. 198/447
4,238,027 12/1980 Oelte .................................. 177/50 X Primary Examiner—George H. Miller, Jr.
Attorney, Agent, or Firm—Lee, Mann, Smith, McWilliams & Sweeney

[57] ABSTRACT

The invention provides a method of assessing the weight of items passing along a conveyor line, which comprises directing the items to pass from the conveyor line onto a conveyor means positioned beside the line so that the items by-pass a length of the conveyor line before rejoining the latter, and weighing the items on a weight assessment device (such as a weigh load cell) included in the conveyor means.

Also provided is apparatus for use in such a method comprising a conveyor means, including a weight assessment device, for location beside the conveyor line, and means for directing the items onto the conveyor means so that they by-pass a length of the conveyor line before rejoining it. The conveyor means conveniently comprises an infeed section, for acceleration and separation of the items and an outfeed section for realignment of the items prior to their return to the conveyor line.

23 Claims, 2 Drawing Sheets

CHECKWEIGHING METHOD AND APPARATUS

This invention relates to a method and apparatus for assessing the weight of items passing along a conveyor line. The invention is of particular use in assessing the weight of items such as food products, most especially liquid food products contained in cardboard cartons, as they pass along a conveyor line forming part of a production line.

It is often desirable to check the weight of items passing along a production line in order that those items not falling within a certain required weight range may be detected and possibly removed from the line. The packer is then provided with an idea of overweight and underweight tolerances for the items being produced and hence a measure of quality control.

The need to assess the weight of individual items is particularly great in the case of packaged liquid food products, where the containers tend to be filled volumetrically with product prior to sealing. During this filling process some cartons are inevitably under filled and it is necessary to detect and remove such items from the production line prior to stacking and distribution.

In recent years, the cardboard carton as a container for liquid food products has become increasingly popular. The carton consists of a waxed cardboard sheet which is formed into a tube of square cross-section, the lower end of which is sealed in a specially designed forming system. The carton is filled with product volumetrically and the top then folded and sealed. Such cartons are presently used to contain products such as milk, cream, fruit juice, speciality sauces and wine. However, as the popularity of this packing medium increases, its use will inevitably extend to include a far greater variety of food and other products.

The equipment currently available for handling liquid food cartons is generally designed to operate at line speeds of between 80 and 120 cartons per minute. Checking the weight of each carton as it passes along the production line poses considerable problems, particularly in areas such as the dairy industry which handles enormous quantities of these cartons.

The conventional method for checking the weight of products is to insert into the production line a checkweighing unit comprising three conveyors. The first conveyor receives products from the main production line and accelerates them sufficiently to allow their separation, thus ensuring that one item at a time passes across the weighing system. The second conveyor comprises a device capable of assessing the weight of the product and the third and final conveyor re-aligns the product and returns it to the main production line for the next stage of the production process.

The device usually used to assess the weight of the product is a conventional weigh load cell across which the product is conveyed. The weight data is transmitted to an analogue to digital convertor, processed and compared against preset tolerances. Items falling outside of the required range can therefore be detected, and the output from the checkweighing device is usually used to control some means for removing such items from the production line at a later stage.

The main disadvantages associated with this conventional method are that it is necessary to break the conveyor line in order to install the checkweighing unit into the production line. Particularly in the case of liquid food filling lines, this is not practical, since the lines tend to take the form of a continuous closed loop running from the filling to the packing station. In the event that the checkweighing unit requires attention, for instance for cleaning or maintenance, then the entire production line must be brought to a halt which is clearly inconvenient.

It is an aim of the present invention to provide a checkweighing method and apparatus for items passing along a conveyor line and in particular for liquid food cartons, which overcomes the problem of breaking the conveyor line associated with conventional checkweighing methods. The apparatus must be easily insertable into the production line to allow for smooth running of the product along a continuous conveyor line.

According to one aspect of the present invention there is provided a method of assessing the weight of items passing along a conveyor line, which comprises directing the items to pass from the conveyor line onto a conveyor means positioned beside the line so that the items by-pass a length of the conveyor line before rejoining the latter, and weighing the items on a weight assessment device included in the conveyor means.

Preferably, the conveyor means comprises an infeed section for acceleration and separation of the items; a weight assessment device across which the items can be conveyed; and an outfeed section for realignment of the items prior to their return to the conveyor line. More preferably, the infeed section comprises two or more sequentially arranged independently controllable conveyors. Most preferably, the infeed section comprises four such independently controllable conveyors, however, this number will depend on the dimensions of the items to be assessed since, for instance, a tall item with a high centre of gravity will need to be accelerated more gently (i.e. a greater number of conveyors in the infeed section) than a smaller or lower item.

Preferably, the outfeed section of the conveyor means comprises two or more sequentially arranged, independently controllable conveyors, most preferably two. Again, the number of conveyors needed will depend on the dimensions of the items to be assessed.

The conveyors preferably comprise toothed conveyor belts, which are less likely to slip than flat conveyor belts in the presence of grease or of spilled liquid products.

The weight assessment device in the present invention may be any conventional weighing device for instance, a weigh load cell on which a conveyor may be mounted. The device must be capable of detecting and preferably displaying the weight of each item. It preferably comprises processing means, which may be electronic, for recording and processing individual item weights. The method of the present invention may also allow for the processing and analysis of the resultant weight data, for instance to provide average weights, standard deviations from the average, etc.

Preferably, the method of the present invention additionally comprises detecting the presence of substandard items not fulfilling certain predetermined weight requirements, and removing such items from the conveyor line at a later stage. The sub-standard items may be removed from the conveyor line by any suitable method, such as mechanically "tripping" rejected items out of the upright position and detecting and discarding all such fallen items or alternatively by means of a trapdoor provided in the first conveyor means, through which a rejected item is allowed to fall. Generally, timer means would be associated with such a removal system, to enable the accurate location of a sub-standard item detected at the weigh assessment device.

In the method of the present invention, it is preferably also possible to direct the items along the entire length of the conveyor line. The direction of items either onto the conveyor means or to continue the entire length of the conveyor line is preferably achieved by means of a gate positionable in one of two or more possible positions. The gate may be either manually controlled or powered. Preferably, a second such gate is provided by means of which items are directed to rejoin the conveyor line from the conveyor means.

According to a second aspect of the present invention there is provided apparatus for assessing the weight of items passing along a conveyor line, comprising a conveyor means for location beside the conveyor line, the conveyor means including a weight assessment device for weighing the items, and means for directing the items onto the conveyor means so that they by-pass a length of the conveyor line before rejoining the latter.

Preferably, the conveyor means comprises an infeed section, for acceleration and separation of the items so as to allow their further passage along the conveyor means in spaced succession; a weight assessment device across which the items can be conveyed and an outfeed section for realignment of the items prior to their return to the conveyor line. Preferably, the infeed section comprises two or more sequentially arranged, independently controllable conveyors, more preferably four. The outfeed section preferably comprises two or more sequentially arranged independently controllable conveyors, more preferably two. As described above, the number of conveyors will largely be dictated by the dimensions of the items to be assessed.

The conveyors conveniently comprise toothed conveyor belts.

The weight assessment device of the apparatus of the present invention may be any suitable weighing device, for instance, a weigh load cell with conveyor means mounted thereon. As described above as being in accordance with the method of the present invention, the weight assessment device may have means associated therewith for the recordal, processing and output of weight data.

The apparatus of the present invention may additionally comprise the conveyor line along which the items pass. This conveyor line preferably comprises a flexible chain conveyor formed from interengaging links of a plastics material. Such a flexible chain can easily be displaced slightly from its original course to allow the conveyor line to continue beside the conveyor means.

Preferably, the apparatus of the present invention additionally comprises means for detecting the presence of sub-standard items not fulfilling certain predetermined weight requirements, and for removing such items from the conveyor line at a later stage. This means for removing sub-standard items may be any suitable means as described above as being in accordance with the method of the present invention.

The apparatus of the present invention preferably also comprises means by which the items can be directed along the entire length of the conveyor line. More preferably, the means by which items are directed either onto the conveyor means or to continue the entire length of the conveyor line comprises a gate positionable in one of two or more possible positions. Preferably, a second such gate is also provided by means of which items are directed to rejoin the conveyor line from the conveyor means.

Additionally provided by the present invention is a production line for food products incorporating at some point along its length apparatus for assessing the weight of said food products as described above as being in accordance with the present invention.

A method and apparatus according to the present invention will now be described by way of example only and with reference to the accompanying drawings, of which:

Figure 1:
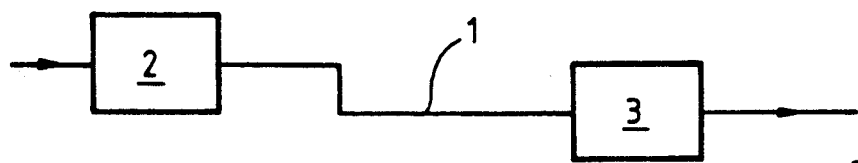
FIG. 1 is a schematic plan view of part of a conventional production line for cartons of liquid food, having no associated means for checking the weight of the product.

Referring firstly to FIG. 1, part of a conventional production line for cartons of liquid food is shown which comprises a filling station 2 and a packing station 3. Filled and sealed cartons pass from 2 to 3 along conveyor line 1, following which they can be stacked ready for storage and/or distribution.

Figure 2:
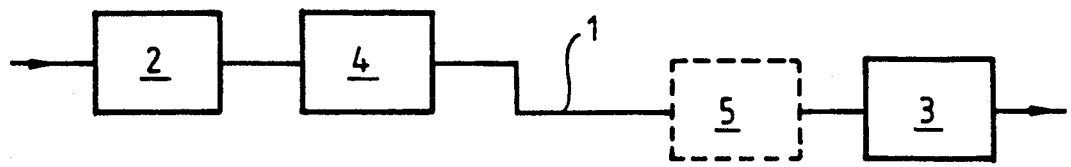
FIG. 2 is a schematic plan view of part of a conventional production line for cartons of liquid food, incorporating means for assessing the weight of the product.

FIG. 2 shows how the production line of FIG. 1 might incorporate a checkweighing station 4 for assessing the weight of all items passing along conveyor line 1. The cartons are filled volumetrically at 2 and it is possible that some may be under-filled. The weight of each individual carton is assessed at 4 to provide the operator with a measure of quality control. A rejection stage 5 may also be incorporated into the production line as shown, at which those articles detected at 4 as being outside the normal weight tolerances could be removed from the production line.

Figure 3:
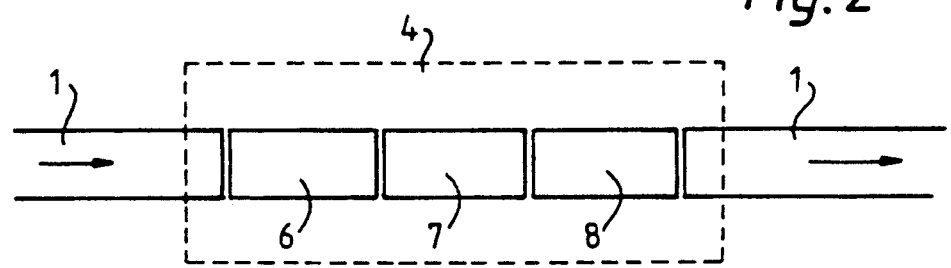
FIG. 3 is a plan view of a conventional checkweighing station such as might be incorporated into the production line of FIG. 2.

FIG. 3 shows a plan view of a conventional checkweigher such as might be inserted into the production line of FIG. 2. The liquid food cartons pass along conveyor line 1 towards the weighing station 4 in the direction shown. They pass from 1 to infeed conveyor 6 which accelerates and separates the cartons. They then pass over the weigh conveyor 7 which comprises a conveyor mounted on a weigh load cell and which detects the weight of each item passing over it. The cartons must naturally be passed along conveyor 7 one at a time and preferably as smoothly as possible so as to allow for sensitive and accurate measurement of their weight, hence the acceleration and separation stage at 6. Outfeed conveyor 8 realigns the cartons before they return to the main conveyor line 1.

Figure 4:
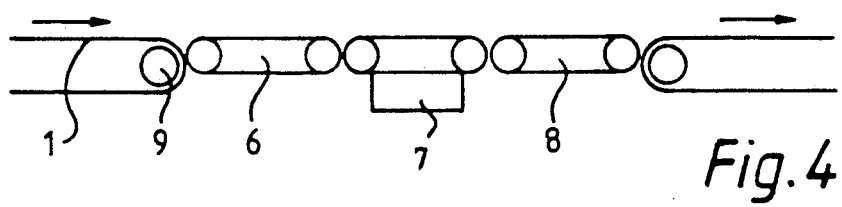
FIG. 4 is a side elevation of the checkweighing station of FIG. 3.

FIG. 4 shows a side elevation of the checkweigher of FIG. 3, in which is it possible to see the three independent conveyors 6, 7 and 8 and the main conveyor line 1 which at the infeed end is driven by pinion 9. There is a break in the production line at the checkweighing station which necessitates the separation of conveyor line 1 into two separate conveyors, individually driven. Should any repair or maintenance be required on either of the conveyors 6, 7 or 8, then the entire production line must be stopped.

Figure 5:
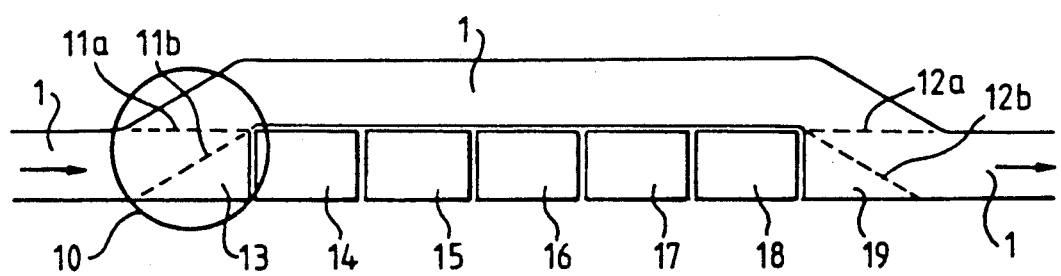
FIG. 5 is a schematic plan view of checkweighing apparatus in accordance with the present invention such as might be incorporated into the production line of FIG. 2.

FIG. 5 is a schematic plan view of a checkweighing apparatus in accordance with the present invention which comprises a main conveyor line 1 and a series of subsidiary conveyors 13-19, which subsidiary conveyors together represent the conveyor means of the present invention. Filled cartons pass along the conveyor line 1 in the direction shown by the arrow and are usually directed along conveyors 13-19 by means of a gate 11. This gate is positionable in either of the two positions 11a or 11b, in the former of which it directs the cartons along conveyors 13-19.

Conveyors 13-16 together represent the infeed section and are controlled either individually or in pairs according to requirements by standard DC motors. Each is a wide toothed timing conveyor belt, which is less likely to slip, in the presence of grease and any spilled liquid product which may be present, than a flat conveyor belt.

By the gradual acceleration of the cartons, the infeed section ensures their smooth separation so that they can pass through the weighing device individually. Particularly the taller (usually, two pint) cartons have a tendency to be unstable in the upright position and it is important to ensure a steady acceleration; instability of the cartons and excessive vibration is likely to adversely affect readings taken at the weighing device.

Because four separate infeed conveyors are used to accelarate the cartons gradually, cartons passing from main conveyor 1 to first infeed conveyor 13 may be virtually abutting and there is no need for the operator to trouble himself ensuring separation of the articles on 1. This represents a considerable advantage over presently known systems.

Conveyor 17 is mounted on a weigh load cell 20 (not shown) and measures the weight of each individual carton passing over it. This data can be processed and displayed in any suitable form, for instance it may be stored to provide an average weight and a measure of deviation from that average and it may be stored against a pack count feature to assist in this. Weighing device 17 may be connected to an alarm which sounds on detection of an underweight article, or the device may be connected to suitable means for rejecting suspect articles at a later point on the production line (5).

Conveyors 18 and 19 are again individually controlled by DC motors and realign the cartons for their return to the main conveyor line 1. For this purpose, the gate 12 occupies position 12a.

Main conveyor line 1, which comprises a flexible chain conveyor formed from interengaging links of a plastics material and is driven by a pinion in the usual way, is diverted slightly to the side of its main direction of travel in order to bypass conveyors 13-19. Thus there is no break in the main conveyor chain which continues along its usual route in a closed loop. In the event of failure of any one of conveyors 13-19, the gates 11 and 12 can be moved to positions 11b and 12b respectively and articles passing along 1 will continue along the production line uninterrupted, bypassing the weighing station.

It is equally possible, in a checkweighing apparatus in accordance with the invention, for the main conveyor line 1 to continue undiverted whilst the products to be assessed are directed onto a conveyor means situated slightly to one side of the main conveyor line (i.e. the products are diverted out of their original direction of travel onto the conveyor means, and back again at gate 12 to rejoin the main line).

Figure 6:
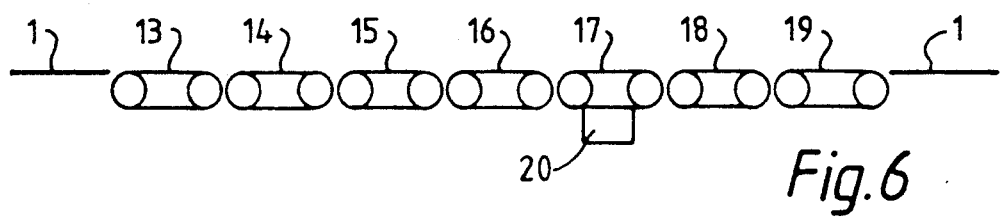
FIG. 6 is a schematic side elevation of the check weighing station of FIG. 5.

FIG. 6 is simply a side elevation of the apparatus of FIG. 5, in which the weigh load cell 20 is shown mounted beneath conveyor 17.

Figure 7:
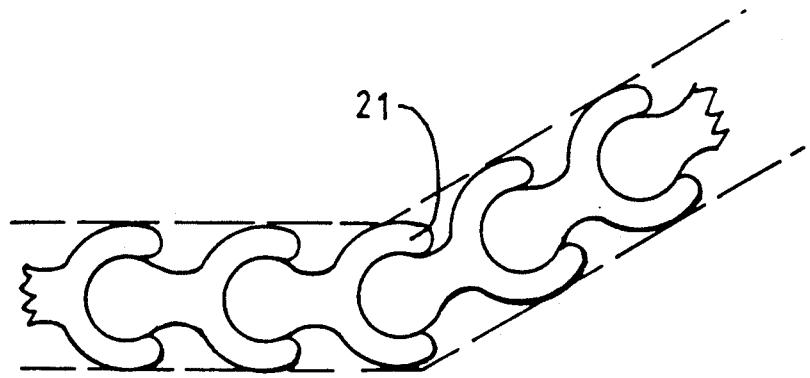
FIG. 7 is a detailed view of part of FIG. 5 as shown by the boundary 10.

FIG. 7 shows a detail of that part of FIG. 5 labelled 10, showing the individual interengaging links 21 of chain conveyor 1. At the point of interengagement, each pair of adjacent links is pivoted to allow movement of each link relative to its adjacent links, both in the plane of the chain to allow the chain to be displaced sideways in order to bypass conveyors 13-19 as shown, and also so as to allow the chain to pass round its driving pinions.

Although this example is restricted to the checkweighing of liquid food cartons, it is understood that the apparatus as described above would be equally useful for any food production line in which the food products require constant assessment of their weight.

The checkweighing station shown in FIGS. 5 and 6 would normally be supplied as a separate unit which could be bolted into the production line as could a conventional section of conveyor belt.

I claim:

1. A method of assessing the weight of items passing along a conveyor line, which comprises directing the items to pass from the conveyor line onto a conveyor means positioned beside the line so that the items bypass a length of the conveyor line before rejoining the latter, and weighing the items on a weight assessment device included in the conveyor means, wherein the conveyor means comprises an infeed section for acceleration and separation of the items; a weight assessment device across which the items can be conveyed; and an outfeed section for realignment of the items prior to their return to the conveyor line.

2. A method according to claim 1, which additionally comprises processing and analysing weight data obtained from the weight assessment device.

3. A method according to claim 1, which additionally comprises detecting the presence of sub-standard items not fulfilling certain predetermined weight requirements, and removing such items from the conveyor line at a later stage.

4. A method according to claim 3, wherein the sub-standard items are removed from the conveyor line by mechanically "tripping" rejected items out of the upright position and detecting and discarding all such fallen items.

5. A method according to claim 1, wherein it is also possible to direct the items along the entire length of the conveyor line.

6. A method according to claim 5, wherein the direction of items either onto the conveyor means or to continue the entire length of the conveyor line is achieved by means of a gate positionable in one of two or more possible positions.

7. A method according to claim 6, wherein items are directed to rejoin the conveyor line from the conveyor means by means of a second gate positionable in one of two or more possible positions.

8. Apparatus for assessing the weight of items passing along a conveyor line, comprising a conveyor means for location beside the conveyor line, the conveyor means comprising an infeed section for acceleration and separation of the items so as to allow their further passage along the conveyor means in spaced succession; a weight assessment device across which the items can be conveyed; and an outfeed section for realignment of the items prior to their return to the conveyor line; and means for directing the items onto the conveyor means so that they bypass a length of the conveyor line before rejoining the latter.

9. Apparatus according to claim 8, wherein the infeed section comprises two or more sequentially arranged, independently controllable conveyors.

10. Apparatus according to claim 9, wherein the infeed section comprises four sequentially arranged independently controllable conveyors.

11. Apparatus according to claim 9, wherein the conveyors comprise toothed conveyor belts.

12. Apparatus according to claim 9, wherein the outfeed section comprises two or more sequentially arranged independently controllable conveyors.

13. Apparatus according to claim 12, wherein the outfeed section comprises two sequentially arranged independently controllable conveyors.

14. Apparatus according to claim 13, wherein the conveyors comprise toothed conveyor belts.

15. Apparatus according to claim 8, wherein the weight assessment device comprises a weigh load cell having a conveyor means mounted thereon.

16. Apparatus according to claim 8, wherein the weight assessment device has means associated therewith for the recordal, processing and output of weight data produced by the weight assessment device.

17. Apparatus according to claim 8, additionally comprising means for detecting the presence of substandard items not fulfilling certain predetermined weight requirements, and for removing such items from the conveyor line at a later stage.

18. Apparatus according to claim 8, additionally comprising means by which the items can be directed along the entire length of the conveyor line.

19. Apparatus according to claim 18, wherein the means by which items are directed either onto the conveyor means or to continue the entire length of the conveyor line comprises a gate positionable in one of two or more possible positions.

20. Apparatus according to claim 19, additionally comprising a second gate, also positionable in one of two or more possible positions, by means of which items are directed to rejoin the conveyor line from the conveyor means.

21. Apparatus according to claim 8, in combination with the conveyor line along which the items pass.

22. Apparatus according to claim 21, wherein the conveyor line comprises a flexible chain conveyor formed from inter-engaging links of a plastics material.

23. A production line for food products incorporating at some point along its length apparatus for assessing the weight of the food products according to claim 8.

* * * * *